US007299422B2

(12) United States Patent
Levine et al.

(10) Patent No.: US 7,299,422 B2
(45) Date of Patent: Nov. 20, 2007

(54) SYSTEM AND METHOD FOR TRANSFERRING PERSONALIZATION INFORMATION AMONG COMPUTER SYSTEMS

(75) Inventors: David Brett Levine, San Francisco, CA (US); Christopher Jason Neumann, San Francisco, CA (US)

(73) Assignee: Migo Software, Inc., Redwood City, CA (US)

( * ) Notice: Subject to any disclaimer, the term of this patent is extended or adjusted under 35 U.S.C. 154(b) by 825 days.

(21) Appl. No.: 10/435,070

(22) Filed: May 8, 2003

(65) Prior Publication Data

US 2004/0165008 A1    Aug. 26, 2004

Related U.S. Application Data

(60) Provisional application No. 60/379,123, filed on May 8, 2002.

(51) Int. Cl.
*G06F 3/00* (2006.01)
*G06F 9/00* (2006.01)
*G06F 17/00* (2006.01)

(52) U.S. Cl. ............... 715/789; 715/864; 715/733; 715/734; 715/737; 715/764; 715/781; 715/788

(58) Field of Classification Search ............ 715/864, 715/733, 734, 737, 769, 764, 781, 788, 789
See application file for complete search history.

(56) References Cited

U.S. PATENT DOCUMENTS 5,737,560 A * 4/1998 Yohanan ............... 715/847

| 5,982,520 A | 11/1999 | Weiser et al. |
| 6,178,443 B1 | 1/2001 | Lin |
| 6,256,378 B1 * | 7/2001 | Iggulden et al. ....... 379/102.03 |
| 6,269,369 B1 | 7/2001 | Robertson |
| 6,393,462 B1 | 5/2002 | Mullen-Schultz |
| 6,651,095 B2 | 11/2003 | Barlock et al. |
| 6,980,175 B1 * | 12/2005 | Narayanaswami ......... 345/2.3 |
| 2002/0010755 A1 | 1/2002 | Rankin |
| 2002/0078367 A1 | 6/2002 | Lang et al. |
| 2002/0111972 A1 | 8/2002 | Lynch et al. |
| 2002/0122076 A1 * | 9/2002 | Nakaki ....................... 345/847 |
| 2002/0143637 A1 | 10/2002 | Shmueli et al. |
| 2002/0145632 A1 | 10/2002 | Shmueli et al. |
| 2002/0147653 A1 | 10/2002 | Shmueli et al. |
| 2002/0147912 A1 | 10/2002 | Shmueli et al. |
| 2002/0162009 A1 | 10/2002 | Shmueli et al. |
| 2003/0110371 A1 | 6/2003 | Yang et al. |

(Continued)

FOREIGN PATENT DOCUMENTS

GB    2387682 A    10/2003

OTHER PUBLICATIONS

PCT, International Preliminary Report On Patentability, Nov. 24, 2005, Wipo.

(Continued)

*Primary Examiner*—Tadesse Hailu
*Assistant Examiner*—Sabrina Greene
(74) *Attorney, Agent, or Firm*—Fliesler Meyer LLP

(57) ABSTRACT

A system and method transfers personalization information to a portable storage device from a first computer system, and then adds personalization information to a second computer system from the portable storage device.

8 Claims, 3 Drawing Sheets

U.S. PATENT DOCUMENTS

| | | |
|---|---|---|
| 2003/0120750 A1 | 6/2003 | Gaxiola et al. |
| 2003/0169283 A1 | 9/2003 | Rosenberg |
| 2004/0001088 A1 | 1/2004 | Stancil et al. |
| 2004/0073787 A1 | 4/2004 | Ban et al. |
| 2004/0107208 A1* | 6/2004 | Seet et al. .................. 707/102 |
| 2004/0128389 A1 | 7/2004 | Kopchik |

OTHER PUBLICATIONS

Written Opinion of the International Searching Authority, Oct. 8, 2004.

* cited by examiner

SYSTEM AND METHOD FOR TRANSFERRING PERSONALIZATION INFORMATION AMONG COMPUTER SYSTEMS

RELATED APPLICATIONS

This application claims the benefit of U.S. Provisional Patent Application Number 60/397,123 entitled, "User Interface Personalization Using an External Computer Readable Medium" filed on May 8, 2002 by David Brett Levine and Christopher Jason Neumann, having the same assignee as this application and such application is incorporated herein by reference in its entirety.

FIELD OF THE INVENTION

The present invention is related to computer software and more specifically to computer application software.

BACKGROUND OF THE INVENTION

Computer systems store files and allow users to process those files. The display of the names and other information about files stored on a computer system may be made via a user interface provided by an operating system. Because the number of files stored on a computer system can be significant, various ways of organizing the files stored on a computer system have been employed to make it easier for a user to locate file.

For example, the conventional Windows XP operating system employs a hierarchy of folders containing files assigned by users or application programs to one of the folders. This allows files to be logically grouped in a manner that facilitates locating any such file.

Although this approach facilitates the location of files from the many files that are stored on the computer system, the user must locate the files in the hierarchy, a cumbersome task. To simplify the task of locating the most used files, some operating systems such as Windows XP, allow users to define shortcuts or other desktop icons that will remain on the operating system "desktop", which is the main screen displayed by the operating system from which files may be located. Because the shortcuts are on the desktop, they may be accessed by clicking on them, without searching through any hierarchy, an arrangement users find far more convenient than searching for files through layers of a hierarchy and then accessing the file by clicking on it. When a user clicks on the shortcut to the file, the operating system will then start the application program associated with that file and cause the application program to open the file. Although some shortcuts have to be set up by the user in advance of their use, if the file will be used a number of times by the user, it can be worth the overhead of arranging the shortcuts onto the desktop.

Although the number of shortcuts that can be displayed on the desktop is limited by the size of the desktop, a user can place onto the desktop a shortcut to his or her most-used files, simplifying the process of accessing the most used files, while allowing the user to use the more-cumbersome hierarchical search method for other files.

Another way of making the most-often-used files and other files easily accessible to users is to employ a certain folder that can be used as storage for documents not already categorized into another folder. For example, the conventional "My Documents" folder can be used as a storage area of files that the user uses most often or to which easy accessibility is desired. When the file will no longer be used as often or easy accessibility is no longer needed, the file may be stored in a different folder. This allows files most often used and other files to be stored in a central location, freeing the user from having to remember various locations of the most frequently used documents and other documents to which easy accessibility is desired. However, users may wish to employ the hierarchical structure of folders to store even frequently used documents, or the use of such hierarchical structure may be needed for other purposes, such as a result of the use of a server or to allow others to easily access the files.

Files to be processed by a computer system may reside on another computer system accessible via the world wide web. Here again, it can be helpful to allow a user to store the name and URL of web sites most frequently used, or those which may not be frequently used, but web sites the user would like to store for future reference. Thus, a folder of files that describe the name and URL of websites, known as the Favorites folder, may be maintained by the user using a conventional browser by using the browser to visit the site and then storing a name for the site and the URL into a Favorites folder using a command or button on the browser.

There have been developed certain devices to allow files to be transferred from one computer system to another. Conventional disks allow the transfer of files from one computer system to another. USB tokens, which are key chain-sized nonvolatile solid state devices that store significant amounts of files, have made it possible to transfer significant amounts of data through a small device that plugs into a conventional USB port and appears to the user as another disk drive, have made it easy for a user to transfer files from computer to computer in a physically secure fashion without having to transmit potentially sensitive files over a network such as the Internet.

However, the transfer of files to such devices can be a cumbersome task, requiring the user to manually locate needed files in the hierarchy of files, or give up the organizational benefits of the hierarchy and manage all needed files in a My Documents folder to allow the entire folder to be transferred, both of which are time consuming, cumbersome processes that must be repeated each time files are to be transferred to the device.

This cumbersome approach has kept such devices from realizing their full potential for reasons other than the transfer of files containing documents and other information a user may process. For example, conventional browsers store the URL and name of favorite web sites into files, which could be transferred from the computer system to a device and transferred to another computer system for use thereon, allowing access to the user's favorite web sites no matter which computer that user was using. But such transfer is cumbersome. If the user wishes to copy such files to such a device, the user must locate them in the hierarchy and copy them onto the device, then copy them into the proper folder of the other computer system, adding more time and another task to the use of such device.

Once the user copies the files to the device, the user's problems are only beginning. The use of the files on the device on a different computer system remain cumbersome. The organizational structure of the files that were transferred is lost, unless the user takes the time to reproduce it in the device, something users do not wish to take the time to do. Even then, the nomenclature of the file structure may be unfamiliar to the user unless the user reproduces the file structure exactly as it is arranged on the computer system from which the files were copied. Even then, the user will lose access to the all of the shortcuts, unless the user arranges them on the computer system to which the device has been transferred, a time consuming, cumbersome task that users will not perform, especially if the use of the device on the second computer system is expected to be temporary.

Another problem with a user who visits a computer system setting up shortcuts or favorite web sites on the computer system being visited using a portable storage device is that any existing shortcuts or favorite web sites that existed on the computer system before the user arranges them can interfere with the number of shortcuts that can be placed on the desktop without excessive clutter, or favorite web sites that can be displayed in a manner that can be easily located.

Furthermore, once the shortcuts and favorite web sites are set up on the computer system, they must be removed or they will remain on the desktop or list of favorite web sites. A user who only briefly visits a computer system would also have to remove all shortcuts added to the computer system and remove favorite web sites from the list of favorite web sites to show consideration for any other user of the visited computer system and optionally, to protect the security of the names of the shortcuts and the favorite web sites the user had installed. If the user manually attempts to install and then remove shortcuts and favorite web sites, the user may accidentally remove any of these that had existed on the computer system before the user installed his or her own, interfering with the operation of the computer system by the user who had installed the original shortcuts and favorite web sites that may be accidentally removed. For all of these reasons, potable storage devices are inconvenient to use.

The conventional MyCompanion product commercially available from the Web site of mycompanion.net, which appears to have been announced on May 24, 2002, attempted to solve these problems by creating for the user of a portable storage device a temporary account on a Windows XP machine, and recreating the user's desktop, favorites and MyDocument settings onto that temporary account, and then switching to that account. Favorites and MyDocuments can be copied from a regular computer system and installed with shortcuts so that the user can use the computer system in a manner that is similar to that from which the favorites and MyDocuments were copied. However, the MyCompanion approach works only on operating systems that allow multiple accounts to be set up, excluding Windows ME or Windows 98, for example, and only then on computer systems that have enabled the administrative privileges that allow the initiation of new accounts. This can severely limit the number of computer systems on which MyCompanion can be used. Because a user would not know in advance whether the computer system which he or she may be visiting will have the capabilities needed to use the MyCompanion system, the user would not have any confidence that the system will be available when that user needs it, eliminating much of the value of the system.

What is needed is a system and method that can allow certain files stored on a portable storage device to be installed as desktop icons such as shortcuts on a computer system without interference from other desktop icons already on the computer system, can make it easy to find files transferred on the portable storage device, can allow the use of favorite web sites from one computer system by another, without requiring a user to manually set up the desktop icons for the files, without requiring the user to manually arrange the files, without requiring the user to manually transfer favorite web sites to the device from the user's computer system and then transfer them from the device to the computer system being visited and that can easily allow the user to remove the desktop icons and list of favorite web sites that had been installed and restore the desktop and list of favorites to their appearances prior to the installation of the desktop icons and favorite web sites from the portable storage device.

SUMMARY OF INVENTION

A system and method transfers personalization information from a first computer system to a portable storage device, and transfers it from the portable storage device to a second computer system, at least attempts to at least suppress the display of one or more existing favorite web sites and then causes desktop icons to one or more files on the portable storage device to be displayed on the second computer system. The transfer may be performed without the creation of a user account for the purpose of transfer or the display of the at least one desktop icon. The system and method may install a hook into a portion of a computer program that manages desktop icons. The portable storage device may communicate via a serial communication interface, such as a USB port. The personalization information transferred may include all of the files in a folder, and the name of the folder from which they are retrieved from the first computer system and the name of the folder into which they are transferred on the portable storage device may be the same. The personalization information may include web site URLs stored as browser favorites.

DETAILED DESCRIPTION OF A PREFERRED EMBODIMENT

Figure 1:
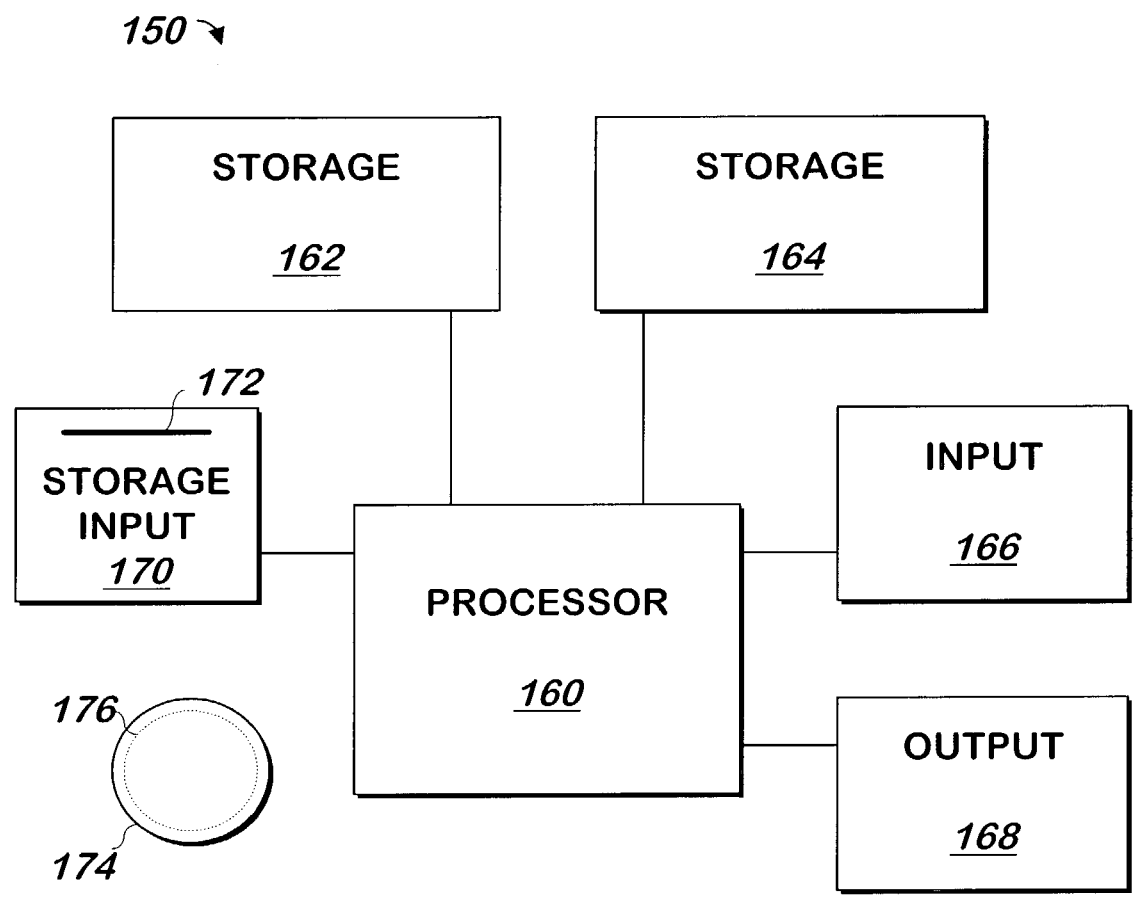
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Texas running a version of the WINDOWS operating system (such as 95, 98, Me, XP, NT or 2000) commercially available from MICROSOFT Corporation of Redmond Washington or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

System Overview

Figure 2:
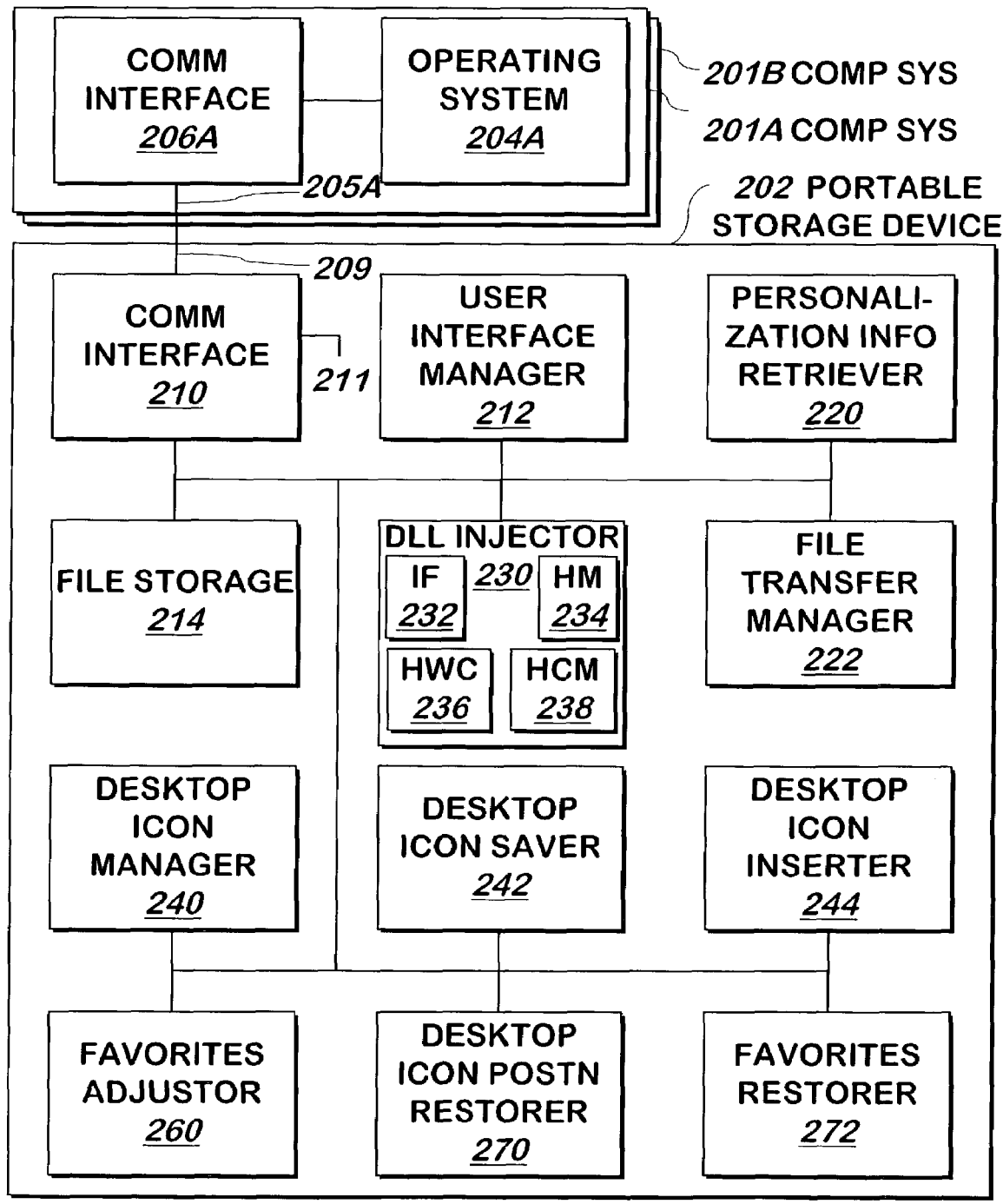
FIG. 2 is a block schematic diagram of a system for personalizing a computer system using information from another computer system and a portable storage device according to one embodiment of the present invention.

Referring now to FIG. 2, a system 200 for using information from a computer system 201A and a portable storage device 202 to personalize another computer system 201B is shown according to one embodiment of the present invention. Computer systems 201A and 201B may be computer systems that are not coupled via a network, or to which access to personalization information on computer system 201A is not available from computer system 201B, either because there is not physical connection, or because the user does not have access to the personalization information on computer system 201A when the user uses computer system 201B.

Personalization information includes information regarding the appearance, operation of, or organization of some or all of the files available on, a computer system that may be altered by the user and persists from session to session, in between which, the computer can be turned off and then restarted. Some or all of the personalization information may be displayed differently from one user to another if the computer supports multiple user accounts. The personalization information described herein includes desktop icons such as shortcuts on the desktop , the arrangement of files on the desktop and in folders and means of accessing them, and Web site names and URLs used by a conventional browser, such as those described above, to display favorite web sites. However, in other embodiments, personalization information can include other information, such as the applications used to control e-mail, web access and printing capabilities, for example.

System 200 includes a portable storage device 202, such as a disk, a USB storage token (e.g. a device containing nonvolatile memory coupled to a USB port, such as the USB Memory Key commercially available from Dell Computer Systems of Round Rock, Tex., or any other device that may be coupled to a computer, and then removed from that computer in a short amount of time, such as ten seconds, relative to the removal of a permanent storage device, such as the main disk drive in a computer system. In one embodiment, the portable storage device 202 is a device that stores computer files, but is not wired to the power supply either directly, or via a single connector accessible only inside the case of the computer system to which it is attached, such as a disk drive. However, the portable storage device 202 can use the power supply of a computer system while it is connected to one, such as a USB storage token, drawing power from a power supply through a connector accessible without removing the case of the computer system.

In one embodiment, portable storage device 202 contains a communication interface 210, which includes a conventional USB hardware interface, as well as software that allows communication interface 210 to be recognized by, and communicate with, a computer system 201A or 201B, to which it is connected at the time. Communication interface 210 includes input/output 209, which may be a conventional USB connector. If portable storage device 202 contains a computer disk, communication interface 210 may not contain such hardware component or may not be present at all.

In one embodiment, when the portable storage device 202 is inserted into a computer system 201A, communication interface 210 communicates with communication interface 206A (which may be a conventional USB interface, disk drive, or other conventional communication interface) and causes the operating system 204A of the computer system 201A to recognize the portable storage device 202 as if it were a conventional disk drive coupled to computer system 201A. The user can then use conventional operating system commands to direct operating system 204A to transfer files from the file storage (not shown) of computer system 201A to file storage 214 of portable storage device 202. In one embodiment, file storage 214 is a portion of flash memory or other storage of portable storage device 202.

In one embodiment, when operating system 204A recognizes the portable storage device 202, it requests from communication interface 210 the name of a program to run and then runs that program, which resides in portable storage device 202. In such embodiment, user interface manager 212 has registered itself to communication interface 210 as the program that should be run, and operating system 204A runs user interface manager 212 when communication interface 210 so instructs. Otherwise, a user can use the operating system 204A to operate user interface manager 212 using conventional operating system commands, such as by typing to operating system 202A the drive designator used for the portable storage device 202 and the name of user interface manager 212 or using a graphical user interface that is part of operating system 202A such as the conventional WINDOWS EXPLORER program to start the program that corresponds to user interface manager 212.

Transferring Personalization Information and Other Files to the Portable Storage Device User interface manager 212 then displays a user interface via a conventional keyboard/monitor/mouse input/output 211 of communication interface 210 to allow the user to do any of the following: manage the transfer of files, copy personalization information from the computer system 201A or 201B with which it is in communication, provide personalization information to such computer and change or suppress the display of certain prior personalization information on that computer system, restore personalization information to the way it was before personalization information was provided to such computer system as described herein, or terminate the operation of user interface manager 212. In the description herein, the computer system from which the personalization information will be retrieved is computer system 201A and the computer system to which the personalization information will be provided is computer system 201B, however, files and the like may be transferred to portable storage device 202 from several other computer systems (not shown), and personalization information may be provided to several other computer systems (not shown).

Manage the Transfer of Files

If the user selects the option to manage the transfer of files, user interface manager 212 signals file transfer manager 222. File transfer manager 222 provides a user interface to the user via input/output 211 to allow the user to identify the files that are to be transferred to the portable storage device 202 when the user requests the transfer of personalization information from the computer system 201A to the portable storage device 202.

In one embodiment, a user can identify files using any conventional file identification method, such as specifying files that meet any of any number of criteria. Criteria may include the folder in which a file resides, a parent folder of such a folder, the name or extension of a file, the date a file was last accessed or modified, or any other criteria.

In one embodiment, the user can also use file transfer manager 222 to specify how desktop icons such as shortcuts will be handled for files. In one embodiment, a user can instruct file transfer manager 222 to restrict or allow the installation of desktop icons onto the desktop for files that are transferred to portable storage device 202 as described above. In one embodiment, a user can instruct file transfer manager 222 to include or exclude files corresponding to desktop icons (e.g. the shortcut files themselves) from being transferred with other files when the file that is the target of the desktop icon matches the criteria specified for the transfer of files as described above.

In one embodiment, certain prespecified criteria are stored by file transfer manager 222. For example, files changed in the last 30 days that are stored in the Desktop (and not sub folders) and files and folders in the Favorites folder may each be prespecified criteria so that all documents meeting those criteria will be retrieved by file transfer manager 222 as described below.

File transfer manager 222 internally stores the criteria and other instructions described herein. When the user has completed specifying the criteria and instructions for the transfer of files, the user indicates to file transfer manager 222, file transfer manager 222 signals user interface manager 212 to provide the user interface described above.

Copy Personalization Information

If the user selects the option to copy personalization information from computer system 201A to portable storage device 202, user interface manager 212 signals personalization information retriever 220. Personalization information retriever 220 signals file transfer manager 222.

Transfer Files

File transfer manager 222 identifies files accessible to computer system 201A that match the criteria and instructions specified by the user as described above and copies the files into removable storage device 214.

Files accessible to computer system 201A may reside on computer system 201A or on a different computer system such as a server (not shown) coupled to computer system 201A. File transfer manager 222 requests from operating system 204A all files that meet the criteria and match the instructions it has internally stored as described above and stores them in file storage 214 via communication interface 210.

Before file transfer manager 222 stores files, it may build folders that do not already exist in file storage 214 that match the entire source UNC and/or path names of the files as they are retrieved from computer system 201A. To identify whether a folder should be built, file transfer manager 222 compares the source path, optionally including a UNC name, of the file it retrieves with the folders that exist in file storage and identifies any portion or all of the path that does not exist in file storage, and then creates that portion or all of the path. For example, if a file meeting the criteria and instructions is retrieved from c:\games\hopscotch\ and a folder named "c" with a subfolder of "games" exists in file storage 214, file transfer manager adds as a subfolder of the "games" folder in file storage 214 a folder named "hopscotch" and stores the files retrieved from c:\games\hopscotch into the c\games\hopscotch folder in file storage 214. In one embodiment, the "c" folder is itself stored as a folder having a name that identifies the computer from which the files were transferred, which is stored as a subfolder to a folder named "Synchronized Computers", which is a folder on the drive letter corresponding to the portable storage device 202.

When file transfer manager 222 has completed transferring all of the files that match the criteria and instructions, file transfer manager 222 signals personalization information retriever.

When signaled, personalization information retriever 220 copies into a c:\windows\favorites folder in file storage 214 the contents of the "Favorites" folder, "Favorites", (a subfolder of the computer name folder as described above) containing the name and URL of favorite web sites used by the browser (not shown) on computer system 201A to display and obtain the URL of the user's favorite web sites. The description herein applies to MICROSOFT WINDOWS 95/98/ME/XP/2000 systems, however, other similar approaches may be used for other operating systems. Using WINDOWS or any other operating system, another folder may be designated by the user using user interface manager 212 in place of the folder described above and user interface manager 212 internally stores such designation for subsequent use, providing such names as required to transfer the files, or the folder containing favorite Web sites may be retrieved (e.g. from a registry) by personalization information retriever 220.

When personalization information retriever 220 has completed retrieving the personalization information as described above, it signals user interface manager 212, which displays the user interface described above and informs the user that portable storage device 202 may be safely removed from computer system 201A.

The user may then use the user interface provided by user interface manager 212 to terminate the operation of user interface manager 212. The user may optionally transfer additional files to, or perform other conventional file or folder operations on the folders in, file storage 214 of portable storage device 202 using operating system (for example, WINDOWS EXPLORER) 201A as described above, and the user may remove the portable storage device 202 to physically move it and to cause it to terminate its communication with computer system 201A.

The user may then transfer portable storage device 202 to another computer system 202B which also contains communication interface 206B (not shown, but similar to communication interface 206A) and operating system 204B (also not shown, but a conventional operating system similar to operating system 204A). In one embodiment, the user connects portable storage device 202 to computer system 201B by coupling input/output 209 of communication interface 210 to input/output 205B of communication interface 206B and operating system 204B recognizes the portable storage device 202 in the same manner as operating system 204A described above.

Providing Personalization Information—Overview

The user then starts user interface manager 212 (or user interface manager 212 is "autorun"ed by operating system 204B when it recognizes portable storage device 202) as described above and user interface manager 212 provides the user interface as described above. If the user selects the option to provide personalization information to the computer system 201B, user interface manager 212 signals ID finder 232 of DLL injector 230 to inject at least a part of DLL injector 230 into the application that manages the desktop and file system.

Inject the DLL

To inject itself as a hook to the application managing the desktop and file system, when signaled by user interface manager 212, DLL injector 230 adds a hook from that application to a portion of itself as described in more detail below. The process of installing a Windows hook is described in Richter, *Programming Applications for Microsoft Windows*, (Microsoft Press, 1999) (including Chapter 22) and that book is hereby incorporated by reference in its entirety. DLL injector 230 is made up of various components 232-238, each of which will now be described.

Find the Desktop Listview Window and Thread ID

ID finder 232 finds the thread identifier of the application that installed the desktop listview window control, then calls hook manager 234 to install a Windows hook as described in more detail below and provides this thread identifier. Hook manager 234 will set in motion the installation of a windows hook, and the creation of a hidden window. ID finder 232 will then test whether the hidden window has been created and stores the handle to this hidden window, all of which will now be described.

To find the thread identifier of the application that installed the desktop listview window control, ID finder 232 first identifies the window handle of the child of the child of the window having a class of "ProgMan" in some operating systems, or the child of the child of the Window having the class of "WorkerW" for other operating systems. In one embodiment, to find the handle to such a window, ID finder 232 requests the handle of a window with the class "ProgMan" by calling the FindWindow Win32 function call (unless otherwise noted herein, all Win32 procedures and function calls are made to operating system 204B) and if the function call returns a value of "null", requests the handle to the window with the class "WorkerW", using NULL as the other parameter. Once the handle to the ProgMan or WorkerW window is obtained, ID finder 232 uses the conventional Win32 function GetFirstChild with the handle to the ProgMan or WorkerW window to obtain a handle to the first child window and then calls the GetFirstChild function again with the child window it receives to obtain the child of the child of either the ProgMan or WorkerW window, which ID finder 232 verifies is of the class "SysListView32".

Using the handle to the child of the child window so located, ID finder 232 identifies the thread identifier to that window by passing the handle to the window as a parameter to the conventional Win32 function GetWindowThreadProcessID and receives the thread identifier of the process that created the desktop listview window control.

ID finder 232 provides the thread identifier of the process that created the desktop listview window control to hook manager 234, with a parameter to instruct it to install a hook, and hook manager 234 receives and stores these items, and performs certain functions described below and sets in motion the creation of a hidden window as described below.

ID finder 232 sleeps via operating system 204B for one second and then performs the Win32 FindWindow function using the expected name of the hidden window. If the function returns null, ID finder repeats the process of sleeping and calling the Win32 FindWindow function until it locates the handle to the window or the number of attempts reaches a threshold, such as ten tries, at which time an error message is provided by ID finder 232. If the handle to the hidden window is returned, ID finder 232 retains the handle to the hidden window and checks the value of the variable that describes whether the server is available as described below. In one embodiment, this check is made via a call to a portion of hidden window creator 236 that checks the variable and reports its status. If the server is available, ID finder 232 provides the handle of the hidden window to user interface manager 212.

Install Hook to Application That Created the Desktop Listview Window Control

In one embodiment, hook manager 234 is arranged as a conventional DLL and stores the thread identifier of the application that created the desktop listview window control it receives. Hook manager 234 receives from operating system 204B the thread identifier of itself.

Hook manager 234 then sends the conventional SetWindowsHookEx Win32 function to operating system 204B and includes the WH_GETMESSAGE constant parameter, the address of hidden window creator 236, the handle to its own instance and the thread to the application that created the desktop listview window control it received as described above. Hook manager 234 receives a handle to the hook in response to the function and stores the handle.

Hook manager 234 sets a variable, that indicates whether the hook has not been used, to true (or such variable is initialized to true when hook manager is called or at another time). Hook manager 234 then uses the conventional Win32 PostThreadMessage 222 to post a WM_NULL message to the thread identifier of the application that created the desktop listview window control, repeatedly, up to ten times, until it receives a true return value 224. Hook manager 234 provides a true value to desktop icon manager 240 if the true return value is received in response to the PostThreadMessage 226.

Create the Hidden Window Upon the First Call

Operating system 204B will call hidden window creator 236 as a result of the PostThreadMessage described above.

Hidden window creator 236 may be a part of the DLL that is also part of hook manager 234, and therefore has access to the variables stored by hook manager 234 or otherwise has access to them. Hidden window creator 236 retrieves the handle to the hook stored by hook manager 234 and also retrieves the variable indicating whether the hook has been used that was initialized as described above.

If the hook has not been used and a handle to the hook has been stored, hidden window creator 236 sets the variable indicating that the hook has not been used to a value of false to prevent subsequent instantiation of a hidden window as described herein. Hidden window creator 236 then checks to make sure that a hidden window that is used as described below does not exist. To make this determination, hidden window creator 236 calls the conventional Win32 FindWindow function with the name of the hidden window and null for the class. If no such window exists, the FindWindow function will return a null value.

If no such window with the name or the hidden window exists as described above, hidden window creator 236 creates the window using the Win32 function CreateDialog with parameters of the handle to the instance of the DLL retrieved and stored by hook manager 234, and a dialog resource id for a hidden dialog (which includes the name of the hidden window that will be used to locate the hidden window as described herein), null as the parent window parameter, and a callback function pointer to hidden window callback manager 238, described below. Hidden window creator 236 then repeats the FindWindow procedure described above to find the handle of the hidden window.

Hidden window creator 236 internally stores the handle to the hidden window and calls the Win32 PostThreadMessage function, with the thread identifier of hook manager 234 stored by hook manager 234 as described above, WM_NULL as the message parameter, and zeros as the wparam and lparam parameters. A "server available" variable, initialized to false at the time hidden window creator 236 is run or at some other time, is then set to true that may be tested by user interface manager 212 and hidden window creator 236 returns to operating system 204B the value returned by calling the CallNextHookEx using the handle to the hook obtained as described above, and the nCode, wParam and lparam parameters received by hidden window creator 236 from the operating system.

Overview of the Operation of Hidden Window Callback Manager

Hidden window callback manager 238 is part of the DLL containing hook manager 234 and message handler 236 and therefore has access to their internally stored variables. Hidden window callback manager 238 responds to WM_CLOSE messages by closing the hidden window using the conventional Win32 DestroyWindow function. Hidden window callback manager 238 responds to WM_APP messages with an lparam value greater than zero by calling desktop icon saver 242 and providing the handle of the desktop listview window control obtained as described above. Hidden window callback manager 238 responds to WM_APP messages with an lparam value equal to zero by calling desktop icon position restorer 270 and providing the handle of the desktop listview window control obtained as described above, each described in more detail below.

Initiate Transfer of Personalization Information

When DLL injector 230 has injected at least the part of itself as a hook as described above, desktop icon manager 240 is signaled as described above. Desktop icon manager then performs the transfer of personalization information as will now be described.

Hide Existing Desktop Icons

When signaled as described above, desktop icon manager 240 calls hidden window callback manager 238 using a WM_APP message with a parameter greater than zero, such as 1, which causes hidden window callback manager 238 to call desktop icon saver 242 to save the location of each icon on the desktop and suppress the display of each such icon.

Desktop icon saver 242 receives the handle of the desktop listview window control from hidden window callback manager 238 as described above. Desktop icon saver 242 requests the screen width and height via the conventional Win32 GetDeviceCaps function using the desktop device context and uses the Horzres and Vertres parameters to obtain the width and height of the screen in pixels. Desktop icon saver 242 defines two new work area rectangles, which are specified as a 2 element array of conventional Windows RECT structures. The first rectangle of type RECT represents pixels on the screen, using the same coordinate system (top left is 0,0) as is the convention, and the second rectangle of type RECT represents an alternate screen, with the top left coordinate one pixel greater than the screen width and bottom right coordinate 100 pixels greater than the screen width and equal to the screen height. Desktop icon saver 242 sets the work areas as areas to be used for the display by using the conventional Win32 ListView_SetWorkAreas function with parameters, the window handle of the listview control, 2 (to indicate the two work areas) and a pointer to the array of two RECTs.

Desktop icon saver 242 then obtains a count of items in the desktop listview window control using the conventional Win32 function ListView_GetItemCount with the handle to the desktop listview window control received by desktop icon saver 242 as described above and stores this count (if the count is zero, desktop icon saver 242 displays an error message and terminates).

Desktop icon saver 242 then deletes the registry locations that may have been previously used to store the desktop icon locations by calling the conventional Win32 RegDeleteKey function with HKEY_CURRENT_USER and variable containing the registry location, which in one embodiment, is "Software\FirstPersonSoftware\PocketLogin\local\Prefs\Dips"

Desktop icon saver 242 then obtains the text and position of each item in the desktop listview window control and stores them in the registry. For each listview item (which desktop icon saver identifies using different item numbers, from 0 to the number of items in the desktop listview window control less 1), to obtain the listview text, desktop icon saver 242 calls the conventional Win32 function ListView_GetItemText and to obtain the position, desktop icon saver 242 calls the conventional Win32 function, ListView_GetItemPosition. To create a registry key and value, desktop icon saver calls the conventional Win32 function RegCreateKeyEx and stores the name of the item as the value and the position of the item as the value data, or stores the name and position using other combinations of one or more keys, values or both.

For each item, desktop icon saver 242 compares whether certain characteristics of the desktop icon (e.g. the name, or the extension of the target) correspond to a list of characteristics of icons that should remain on the desktop (e.g. icons named Internet Explorer, Network Neighborhood, etc. should remain.). If the characteristics of the desktop icon do not correspond to characteristics of those that should remain on the desktop, desktop icon saver 242 calls the conventional Win32 ListView_SetItemPosition function with a vertical coordinate equal to the vertical coordinate of the item, but uses a horizontal coordinate that is 64 pixels to the right of the screen, thus removing such desktop icons while preserving the others on the screen.

Desktop icon saver 242 then closes the registry key by calling the conventional Win32 function RegCloseKey and returns control to desktop icon manager 240.

Remove the Hook

In one embodiment, desktop icon manager 240 then signals hook manager 234 to remove the Windows hook. When so signaled, hook manager checks the variable storing the handle to the hook, and if it does not exist (e.g. has a zero value), returns control to desktop icon manager 240. If the handle to the hook exists, hook manager 234 finds the hidden window as described above and destroys it. Hook manager then calls the conventional Win32 function, UnhookWindowsHookEx, and reinitializes the variables that store the handle to the hook, the variable indicating whether the hook has been used, and the variable indicating the server is available.

In another embodiment, desktop icon manager 240 does not remove the Windows hook. Instead, each time operating system 204B receives any sort of message that causes it to redraw some or all of the screen, such messages are received by hidden window creator 236, which signals desktop icon manager 240, which signals desktop icon saver 242 to repeat the process of moving off-screen the originally-displayed desktop icons from the desktop (as described above but does not repeat the process of saving them to the registry) to ensure that they do not reappear when the screen is refreshed.

Desktop icon manager 240 then obtains the drive designator of the portable storage device 202 using the conventional Win32 function GetModuleFileName, and signals desktop icon inserter 244 with the drive designator of portable storage device 202.

Insert Desktop Icons

When signaled by desktop icon manager 240, desktop icon inserter 244 builds and inserts onto the desktop of the computer system 201B a desktop icon (e.g. a shortcut) to each user file that is stored in the My Computer folder of file storage 214. In addition, desktop icons that were placed on the desktop of computer system 201A that pointed to a file that was transferred into file storage 214 as described above are built and added to the desktop of computer system 201B by desktop icon inserter 244, but such desktop icons have a target of the file in file storage 214. To add an icon to the desktop, desktop icon inserter 244 requests an instance of a COM object implementing the IShellLink of operating system 204B to add it to the desktop.

In one embodiment, desktop icon inserter 244 also adds to the desktop a desktop icon titled "My Computer", with a target as the My Computer folder of removable storage device 202 that holds files transferred by file transfer manager 222.

When desktop icon inserter 244 has completed building and inserting a desktop icon for each of the files described above onto the desktop of computer system 201B, desktop icon inserter 244 signals desktop icon manager 240, which signals favorites hider/mover 260 and provides the drive designator of the portable storage device 202.

Hide/Move Favorites

When signaled by my documents adder 252, favorites hider/mover 260 saves the value data from the entry in the registry corresponding to the Favorites directory and adjusts that value data to point to the Favorites directory in file storage 214 into which the favorites files from computer system 201A were stored as described above.

Restoring the Computer System

The user may then use computer system 201B with the personalization information installed as described above. When the user is ready to remove the portable storage device from computer system 201B, the user signals user interface manager 212 to remove the personalization information. When signaled by the user to remove personalization information, user interface manager 212 signals desktop icon manager 240 with an indication to restore the desktop and Favorites folder. Desktop icon manager 240 calls hook manager 234 to reinstall the hook as described above, and then calls hidden window callback manager 238 using a WM_APP message with a parameter equal to zero. Hidden window callback manager 238 calls desktop icon position restorer 270 and provides the handle of the desktop listview window control obtained as described above.

Restore Desktop Icons

When called by hidden window callback manager 238, desktop icon position restorer 270 receives the handle to the desktop listview window control from hidden window callback manager 238, obtains the drive designator of the portable storage device 202 as described above, and requests, (via the Win32 DeleteFile function) the operating system 204B to remove the shortcut or other similar files corresponding to the desktop icons installed by desktop icon inserter 244 (which desktop icon position restorer 270 can identify as such because they point to files having the drive designator of the portable storage device 202, and in another embodiment, desktop icon restorer uses a list of icons that were inserted by desktop icon inserter 244 that desktop icon inserter 244 builds and stores into file storage 214 as it builds the desktop icons as described above) and then calls the conventional Win32 function ListView_SetWorkAreas using as parameters, the handle to the desktop listview window control it receives, 0 and null so as to restore the work areas to their state before they were altered as described above. Desktop icon position restorer 270 then opens the registry key via the conventional Win32 function RegOpenKeyEx. Desktop icon position restorer 270 retrieves the existing window style using the conventional Win32 function GetWindowStyle, using the desktop listview window control handle as a parameter, stores the existing window style, and then disables the desktop listview's auto arrange functionality via the conventional Win32 function call SetWindowLong with the existing window style bitwise anded with the conventional Win32 constant value ~LVS_Autoarrange as a parameter to that function.

For each desktop listview item, desktop icon position restorer 270 retrieves the name of the item using the conventional Win32 function ListView_GetItemText and uses the item text to retrieve the corresponding position from the registry and the position for that item is returned in the desktop listview window control to its value from the registry using the conventional Win32 setListViewItemPosition function, and the coordinates from the registry.

Desktop icon position restorer 270 then restores the style to the desktop listview window control using the conventional Win32 function, SetWindowLong and the original style it retrieved as described above. Desktop icon position restorer 270 then calls the conventional Win32 function, SaveListViewItemPositions and returns control to Desktop icon manager 240 via hidden window callback manager 238.

Desktop icon manager 240 destroys the hidden window by sending a WM_CLOSE message to hidden window callback manager 238 as described above. Desktop icon manager 240 then signals user interface manager 212, which signals favorites restorer 272.

Restore Favorites

When signaled by user interface manager 212, favorites restorer 272 resets the favorites folder to point to the folder stored by favorites adjustor 260, and then signals user interface manager 212, which indicates that the removable storage device 202 may be removed from the computer system 201B.

Synchronize Files

In one embodiment, the user may then return the portable storage device 202 to computer system 201A and select an option provided by user interface manager 212 to restore the files changed on file storage 214 to the file storage area from which the file was retrieved as described above. To perform such restoration, in one embodiment, user interface manager 212 signals file transfer manager to restore files 222. File transfer manager 222 requests operating system 204A to copy all files from their locations in file storage 202 to the corresponding locations in the file storage locations accessible to computer system 201A. In another embodiment, file transfer manager 222 transfers only those files from file storage 214 that have properties (e.g. modification date and time, size, etc) different from their corresponding files on storage locations accessible to computer system 201A.

File transfer manager 222 then synchronizes the files in the favorites folder in file storage 214 with the folder used for favorites on computer system 201A by deleting files in the favorites folder used for favorites on computer system 201A that are not in the favorites folder in file storage 214 and copying to the folder used for favorites by computer system 201A files that are in the favorites folder in file storage 214 but not in the folder used for favorites by computer system 201A or files in both locations that have different properties.

When file transfer manager 222 completes synchronizing the files and favorites, file transfer manager 222 signals user interface manager 212, which provides the user interface described above.

Figure 3:
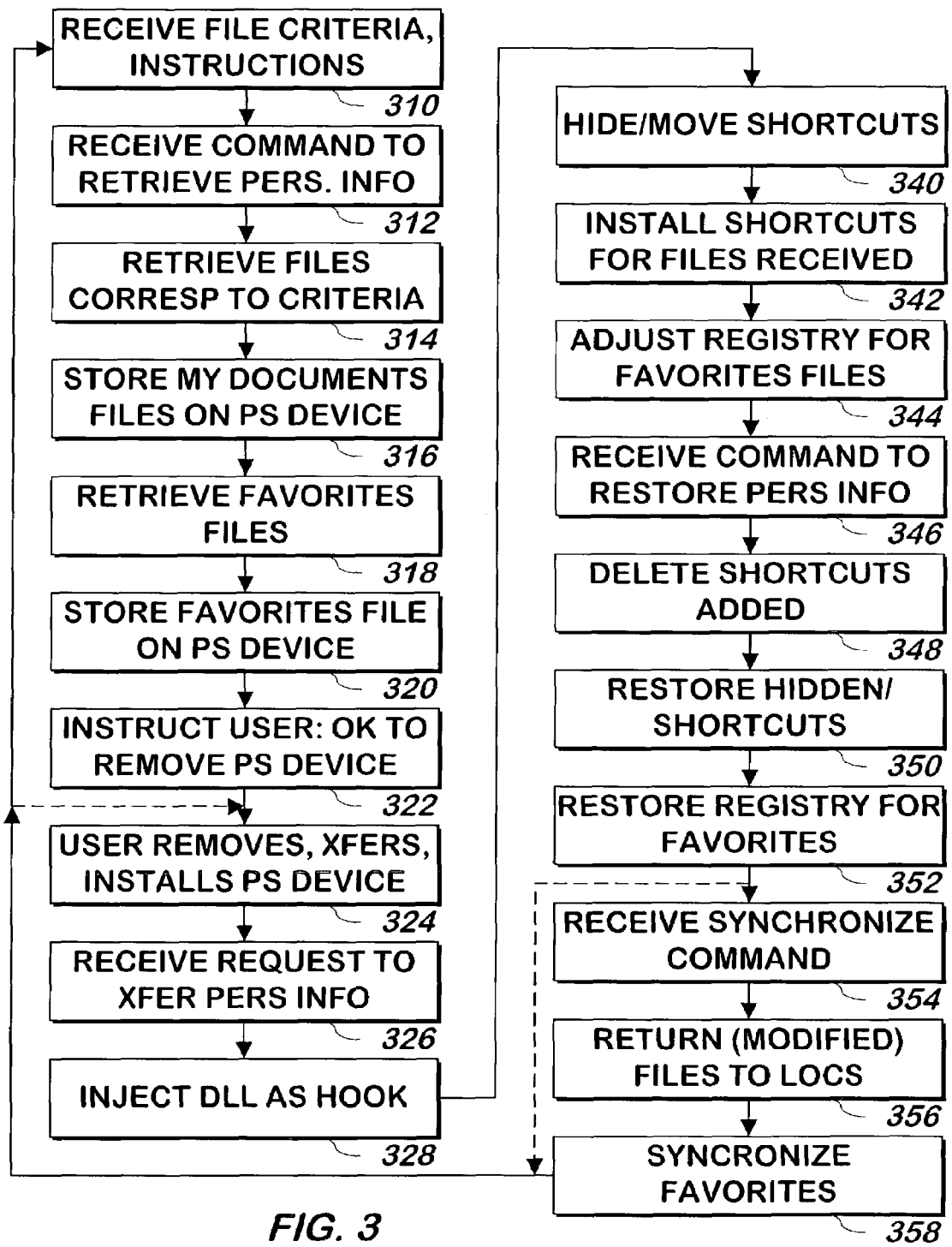
FIG. 3 is a flowchart illustrating a method of personalizing a computer system using information from another computer system and a portable storage device according to one embodiment of the present invention.

Referring now to FIG. 3, a method of personalizing a computer system using personalization information from another computer system and information on a portable storage device is shown according to one embodiment of the present invention. One or more file criteria and instructions may be received 310 to identify which files should be transferred for storage on a portable storage device. A command to retrieve personalization information may be received 312 as described above. In response to the command received in step 312, steps 314-322 are performed.

Files may be retrieved 314 from a computer to which the portable storage device is in communication and stored 316 on the portable storage device. Step 316 may include reproducing the folder structure from which the files were retrieved, including all parent folders. One or more favorites files may be retrieved 318 from a computer to which the portable storage device is in communication and stored 320 on the portable storage device. The user may be instructed 322 that it is safe to remove the portable storage device.

The user may then disconnect the portable storage device from the computer system to which it is connected, transfer the portable storage device, and then connect it to a different computer system 324. A request is received 326 to transfer personalization information to the computer system to which the portable storage device has been installed. Steps 328-344 are performed in response to this command.

A DLL may be injected 328 as a windows hook into the operating system as described above. Some or all of the existing desktop icons are hidden, moved, or both as described above 340. Shortcuts or other desktop icons for files in the My Documents folder on the portable storage device and are installed 342 as described above and other desktop icons may be installed as described above, such as icons corresponding to icons on the desktop on the first computer system that point to files that meet the file criteria specified above. An icon representing the portable storage device may be installed as part of step 342.

The registry value data corresponding to the browser favorites folder is saved and then adjusted to point to the folder to which the favorites were stored on the portable storage device 344.

A command is received 346 to restore the personalization information of the computer system to which the portable storage device is in communication, and steps 348-352 are performed in response. Desktop icons added in step 332 are deleted 348 and desktop icons hidden, moved or both in step 330 are un-hidden, moved back to their original locations, or both 350.

The registry entry for the folder holding the favorites files adjusted in step 344 is restored 352 to point to the folder that it pointed to prior to step 344.

The user may then return the portable storage device to the computer from which the files were copied. A command may be received 354 to synchronize the files. Files and favorites are synchronized 356, 358 as described above.

What is claimed is:

1. A method of personalizing a computer system, comprising:

transferring from a first computer system to a portable storage device, personalization information comprising at least one of (1) a web site designated by a user, (2) a file stored at the first computer system, (3) a folder defined at the first computer system, and (4) an email retrieved at the first computer system;

transferring at least a portion of the personalization information from the portable storage device to a second computer system;

suppressing display of a user interface at a second computer system upon connecting the portable storage device to the second computer system, wherein suppressing said display includes hiding at least one existing desktop icon that would normally have been displayed on the second computer had the portable storage device not been connected to the second computer, and instead displaying at least one icon associated with the personalization information retrieved from the portable storage device, wherein suppressing the display further includes:

defining a first area rectangle and a second area rectangle, wherein the first area rectangle represents pixels on a screen using a same coordinate system as said screen and wherein the second area rectangle represents an alternate screen; and causing the second computer system to use the personalization information retrieved from the portable storage device in place of information that otherwise would be provided on the second computer had the portable storage device not been connected to the second computer.

2. The method of claim 1 wherein the causing step includes transfer of the personalization information from the portable storage device to the second computer system without creating a user account.

3. The method of claim 1 further comprising installing a hook into a computer program that manages desktop icons on the second computer system.

4. The method of claim 1, wherein the portable storage device communicates with the first computer system and the second computer system via a serial communication interface.

5. The method of claim 1, wherein the personalization information comprises all files in at least one first folder.

6. The method of claim 5 wherein the files are transferred to at least one second folder on the portable storage device having at least one name corresponding to at least one name of the at least one first folder.

7. The method of claim 1 wherein the at least one web site designated by a user comprises at least one of a plurality of web site URLs stored as browser favorites.

8. The method of claim 1, further comprising:

disconnecting said portable storage device from the second computer system; and restoring the second computer system such that the personalization information is removed from said second computer system.

* * * * *